(12) United States Patent
Borthakur et al.

(10) Patent No.: US 9,558,081 B2
(45) Date of Patent: Jan. 31, 2017

(54) HYPERVISOR ASSISTED VIRTUAL MEMORY OBFUSCATION

(71) Applicant: Amazon Technologies, Inc., Seattle, WA (US)

(72) Inventors: Apolak Borthakur, Palo Alto, CA (US); Raviprasad Venkatesha Murthy Mummidi, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/012,740

(22) Filed: Feb. 1, 2016

(65) Prior Publication Data

US 2016/0147619 A1    May 26, 2016

Related U.S. Application Data

(63) Continuation of application No. 14/295,239, filed on Jun. 3, 2014, now Pat. No. 9,251,090.

(51) Int. Cl.
| | |
|---|---|
| *G06F 11/14* | (2006.01) |
| *G06F 12/10* | (2016.01) |
| *G06F 11/10* | (2006.01) |
| *G06F 12/14* | (2006.01) |
| *H04L 29/06* | (2006.01) |

(52) U.S. Cl.
CPC ....... *G06F 11/1484* (2013.01); *G06F 11/1016* (2013.01); *G06F 12/1009* (2013.01); *G06F 12/1408* (2013.01); *H04L 63/0442* (2013.01); *G06F 2201/815* (2013.01); *G06F 2212/1052* (2013.01)

(58) Field of Classification Search
CPC .............. G06F 11/1484; G06F 11/1016; G06F 12/1408; G06F 12/1009; H04L 63/0442
USPC ...................... 711/133, 156, 159, 206; 718/1
See application file for complete search history.

(56) References Cited

U.S. PATENT DOCUMENTS

| | | | | |
|---|---|---|---|---|
| 7,870,336 B2* | 1/2011 | Erlingsson | .......... | G06F 12/0802 711/111 |
| 8,156,343 B2* | 4/2012 | Robinson | ................ | G06F 21/71 711/152 |
| 8,347,114 B2* | 1/2013 | Gremaud | ............ | G06F 12/1408 713/189 |
| 8,364,932 B2* | 1/2013 | Ali | ...................... | G06F 12/1009 711/205 |
| 8,464,011 B2* | 6/2013 | Krig | ........................ | G06F 21/57 365/185.33 |

(Continued)

*Primary Examiner* — Stephen Elmore
(74) *Attorney, Agent, or Firm* — Davis Wright Tremaine LLP

(57) ABSTRACT

Remote computing resource service providers allow customers to execute one or more applications in a virtual environment on computer systems provided by the computing resource service provider. The virtual machines may be managed by a hypervisor executing on computer systems operated by the service provider. The virtual machines' memory may be protected by a memory obfuscation service and the hypervisor. The memory obfuscation service may enable the virtual machines to maintain at least a portion of sensitive information in an obfuscated format. The virtual machines may request access to the virtual machines' memory, the memory obfuscation service may obtain the requested memory in an obfuscated format and un-obfuscate the memory such that it may be used by the virtual machines.

20 Claims, 9 Drawing Sheets

(56) References Cited

U.S. PATENT DOCUMENTS

| | | | |
|---|---|---|---|
| 8,799,673 B2* | 8/2014 | Savagaonkar | G06F 12/1441 |
| | | | 713/189 |
| 8,990,558 B2* | 3/2015 | Grabelkovsky | G06F 21/6218 |
| | | | 713/165 |
| 9,087,000 B2* | 7/2015 | Robinson | G06F 21/71 |
| 2005/0114610 A1* | 5/2005 | Robinson | G06F 21/71 |
| | | | 711/152 |
| 2010/0125914 A1* | 5/2010 | Dandekar | G06F 21/6281 |
| | | | 726/26 |
| 2013/0067184 A1* | 3/2013 | Robinson | G06F 21/71 |
| | | | 711/164 |
| 2013/0132690 A1* | 5/2013 | Epstein | G06F 12/145 |
| | | | 711/159 |
| 2013/0133026 A1* | 5/2013 | Burgess | G06F 21/62 |
| | | | 726/1 |
| 2013/0205062 A1* | 8/2013 | Ali | G06F 12/1009 |
| | | | 711/6 |
| 2014/0115292 A1* | 4/2014 | McLachlan | G06F 12/02 |
| | | | 711/170 |
| 2014/0282534 A1* | 9/2014 | Sehr | G06F 9/455 |
| | | | 718/1 |
| 2014/0331279 A1* | 11/2014 | Aissi | G06F 21/53 |
| | | | 726/1 |
| 2014/0366017 A1* | 12/2014 | Krten | G06F 9/45558 |
| | | | 718/1 |
| 2015/0100791 A1* | 4/2015 | Chen | G06F 12/1408 |
| | | | 713/189 |
| 2015/0227742 A1* | 8/2015 | Pereira | G06F 21/56 |
| | | | 726/24 |
| 2015/0278119 A1* | 10/2015 | Loh | G06F 12/1408 |
| | | | 713/193 |

* cited by examiner

HYPERVISOR ASSISTED VIRTUAL MEMORY OBFUSCATION

CROSS-REFERENCE TO RELATED APPLICATION

This application is a continuation of U.S. Pat. No. 9,251,090, filed Jun. 3, 2014, entitled "HYPERVISOR ASSISTED VIRTUAL MEMORY OBFUSCATION," the disclosure of which is incorporated by reference herein in its entirety.

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may provide secure partitioning of computer system resources by executing multiple virtual machine instances on a single physical host machine. Various components of the hypervisor may require privileged access to the physical host machine in order to provide effective administration of the virtual machine instances. Although reasonable precautions may be taken when developing hypervisors, reducing the risk of such attacks is a complex endeavor, typically requiring a lot of skill and resources.

Operating systems and applications, including virtualized operating systems and applications, use data obfuscation techniques to implement secure channels and trust zones for secure application execution. A variety of cryptographic techniques may be used to accomplish secure channels and trust zones such as by encrypting sensitive data at rest when in persistence storage or encrypting communications over an un-secure public network. Generally, during application execution, cryptographic keys and other sensitive information used by the application may be stored in memory without any protection. In a virtualized environment supported by a hypervisor, the application's security is typically limited to the security features provided by the guest operating system. Furthermore, physical hardware may be shared across multiple operating systems when the operating systems run in a virtualized environment.

BRIEF DESCRIPTION OF THE DRAWINGS

Various embodiments in accordance with the present disclosure will be described with reference to the drawings, in which.

DETAILED DESCRIPTION

Figure 1:
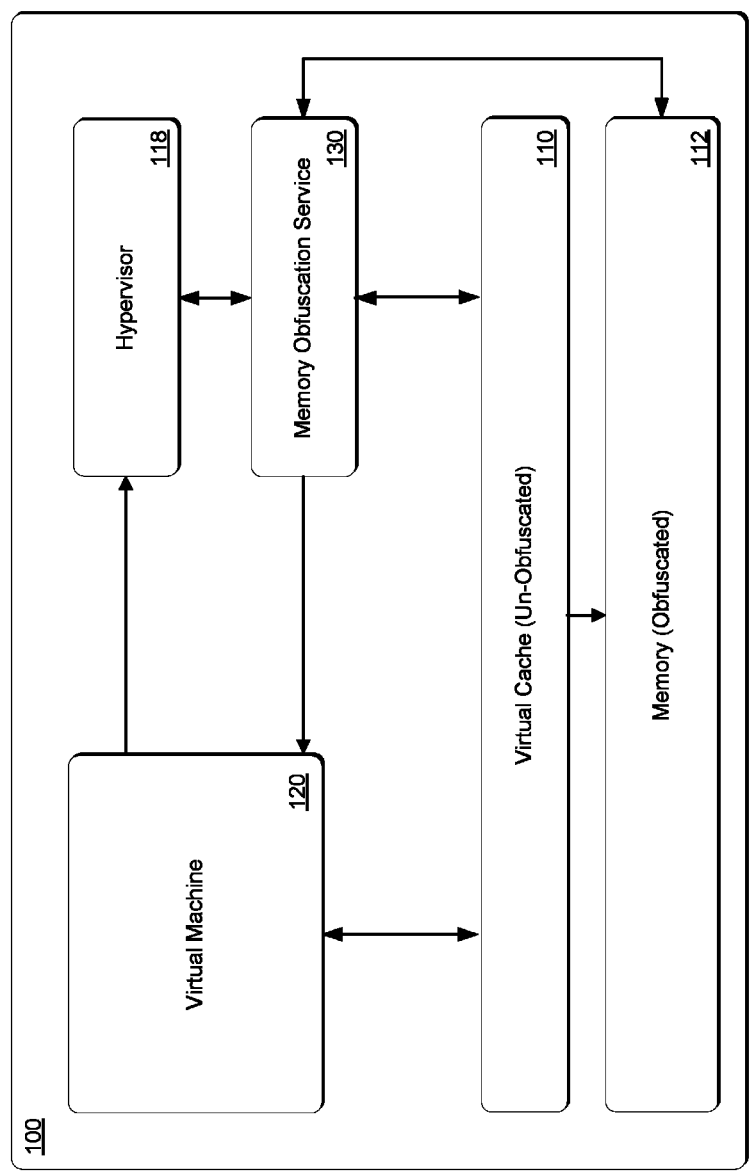
FIG. 1 is an illustrative example showing a host computer system supporting a virtual machine with obfuscated memory in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to virtualized environments supported by a hypervisor in order to improve the security of sensitive data. The hypervisor may be extended to provide hypervisor based obfuscation of virtual machine memory in order to prevent examination or exposure of virtual machine memory. For example, an attacker may attempt to compromise one or more virtual machines executed on a host computer system by breaking down isolation barriers put in place by the hypervisor supporting the one or more virtual machines. A service or other component, such as a memory obfuscation service, may be added to the hypervisor in order to obfuscate the memory of the one or more virtual machines in order to protect the virtual machines' memory if the hypervisor isolation is attacked. The memory obfuscation techniques used by the memory obfuscation service may include, but are not limited to, the encryption of memory pages used by the virtual machines (also referred to as guest operating systems). The memory obfuscation service may operate in the hypervisor context asynchronously with respect to the execution of the virtual machines supported by the hypervisor. A memory page, in some embodiments, is a fixed-length contiguous block of virtual memory that is the smallest unit of data for memory allocation to the virtual machine performed by the hypervisor and the transfer between memory and any other auxiliary data store, such as a storage service.

The memory obfuscation service may virtualize at least a portion of a cache associated with a processor, such as the last level of cache. Virtualization of the cache may be accomplished by context switching between virtual caches of various guest operating systems and overlaying the active areas of the virtual caches on the physical cache of the host system's processor(s). In some embodiments, operations of the virtual machines memory, such as un-obfuscating and/or obfuscating memory, is limited to the virtual central processing units (VCPUs) associated with the virtual machines, thereby reducing the attack surface of the sensitive data. The virtual cache may be dynamically sized, where the size of the virtual cache may be determined by actively monitoring the memory usage of the guest operating system. Performance of the virtual machines may be dynamically increased or decreased based at least in part on the activity of the virtual machines. Furthermore, users may set various aspects of the virtual cache, such as a maximum or minimum size. The user-specified properties of the virtual cache may allow the user to manage both the level of performance of the virtual machines as well as the security provided to the virtual machine. The dynamic sizing of the virtual cache may be used to optimize the performance and the security of the virtual machines. Access to the virtual cache may be limited such that only the virtual machine associated with the virtual cache may access the contents of the virtual cache.

The memory obfuscation service may receive information corresponding to memory requests of the virtual machines from a memory management unit associated with host computer system's central processing unit (CPU). The memory obfuscation service may also be configured to receive information corresponding to memory request of the virtual machines from a virtual memory management unit associated with the virtual machines VCPU. The memory request may include any request to read, write or otherwise access memory associated with a virtual machine. The memory management unit may be responsible for maintaining a set of data structures configured to map the virtual machines' virtual address space to the physical address space of the host computer system executing the virtual machines. The memory management unit may be implemented as hardware of the host computer system, as executable code included in the hypervisor or as a combination of hardware and software. The memory management unit may also provide memory paging and other memory protection techniques to enable memory obfuscation/un-obfuscation of the virtual machine's memory by the memory obfuscation service. The memory obfuscation service may be supported by host computer systems and/or hardware components thereof.

In various embodiments, when the virtual machines are instantiated, all of the memory pages may be in an obfuscated form, such as encrypted at rest (i.e., while in persistent storage) as part of a virtual disk or in an encrypted snapshot of the virtual machines' memory from a previous instantiation of the virtual machine. The virtual machines may be denied by the hypervisor direct access to reading or executing from obfuscated memory pages. When the virtual machines attempt to access an obfuscated memory page, the hypervisor may receive a notification by the memory management unit associated with the host computer system CPU. The hypervisor may then pass control over to the memory obfuscation service to enable to memory obfuscation service to obfuscate the obfuscated memory page so it can be used by the particular virtual machine requesting the memory page. The memory obfuscation service may un-obfuscate (also referred to as deobfuscate) the memory page and set the appropriate mapping of the physical address to the virtual address in the data structures (e.g., page tables) of the memory management unit. Control may then be returned to the hypervisor or the particular virtual machine and the attempt to access the memory page may be retried. The particular virtual machine may then access the memory page in an obfuscated format.

The memory obfuscation service may periodically or aperiodically determine if un-obfuscated memory pages are in active use by the virtual machines and obfuscate unused memory pages. The memory obfuscation service may initiate an activity timer to monitor un-obfuscated memory page usage. If a particular un-obfuscated memory page is not accessed before the expiration of the time the particular un-obfuscated memory page may be detached from the memory management unit. For example, unused un-obfuscated memory pages may be unmapped or otherwise removed from the data structures management by the memory management unit. A second timer may then be initiated to determine if a memory page request for the un-obfuscated memory pages removed from the data structures of the memory management unit is received. If a memory page request is received before the expiration of the time the particular un-obfuscated memory page may be reattached or otherwise inserted into the page tables of the memory management unit. At the expiration of the second time the un-obfuscated memory page may be re-obfuscated and store in memory. In various embodiments, the un-obfuscated memory pages are copies of obfuscated memory pages and the memory management unit deletes or otherwise destroys the un-obfuscated memory pages after the expiration of the second timer.

In some embodiments, performance of the virtual machines may be improved by identifying patterns in the use of particular memory pages and preloading the virtual cache to match the identified patterns. Machine learning algorithms may be user identify typical diurnal usage patterns for memory pages. The user may also specify memory pages or particular data to be preloaded into memory. The user may also be allowed to specify the size of the virtual cache. A larger virtual cache may translate to better virtual machine performance. While a smaller virtual cache would allow more of the user's data to remain obfuscated during execution of the virtual machines. When the virtual machines' memory is snapshotted or otherwise persisted in a storage device, the contents of the virtual machines' virtual cache may first be obfuscated before committing the memory pages into the storage device. Furthermore, the virtual machines' memory may be partially obfuscated. For example, a user may define a certain amount of the virtual machines' memory, including data generated by the virtual machine, a sensitive information. This may cause the memory obfuscation service to obfuscate the defined portion of the virtual machines' memory and maintain the defined portion of the virtual machines' memory in an obfuscated format.

FIG. 1 is an illustrative example of a host computer system 100 with a virtual cache and obfuscated memory in order to protect sensitive information. As noted above, techniques described herein are applicable to supporting virtual machine memory obfuscation and un-obfuscation. Accordingly, FIG. 1 shows the host computer system 100 including memory 112. The memory 112 may include static or dynamic memory. Furthermore, the memory 112 may be the physical memory of the host computer system 110 or may be virtual memory provided to the host computer system 100 or component thereof. The memory 112 may contain obfuscated data associated with a virtual machine 120. Although only one virtual machine is illustrated in FIG. 1, the host computer system 100 may execute a plurality of virtual machines, the plurality of virtual machines may share the same memory 112 or different memory 112. The host computer system 100 may also contain a hypervisor 118, the hypervisor may be configured to provide virtualization support for the virtual machine 120.

The hypervisor 118 may be a bare metal or hosted hypervisor and the hypervisor 118 may manage the virtual machine's 120 access to the physical hardware of the host computer system 100. The hypervisor 118 may also be configured to manage the plurality of virtual machines described. The virtual machine 120 may execute a customer application or may be one of a plurality of virtual machines executing the customer application. The virtual machine 120 may also execute an operating system such as WINDOWS® or LINUX®. Furthermore, the virtual machine 120 may be a parent partition or root partition configured to communicate with the hypervisor 118 and manage one or more child partitions or user partitions. The hypervisor 118 may interact with a memory obfuscation service 130 in order to provide the virtual machine 120 with access to un-obfuscated memory in the form of a virtual cache 110.

The memory obfuscation service 130 may be a process of the hypervisor 118 configured to un-obfuscate memory pages for the virtual machine 120. For example, the memory obfuscation service 130 may be a component of the hypervisor 118 configured to receive memory page requests and provide the memory pages in an un-obfuscated format in response to the request. The memory obfuscation service may further be configured to obfuscate unused memory pages (also referred to as cold or inactive memory pages) as described in greater detail below in connection with FIG. 6. The virtual machine 120 may request access to a particular memory page contained in an obfuscated format in memory 112. During instantiation of the virtual machine 120 all or a portion of the virtual machine's 120 memory may be loaded into memory 112 of the host computer system 100. The virtual machine's 120 memory may be obfuscated in order to protect information contained in the memory from attack. The virtual machine's 120 memory may remain obfuscated in the memory 112 of the host computer system 100 until it is required by the virtual machine 120 and placed in the virtual cache 110.

When the virtual machine 120 attempts to access data stored in memory 112, for example reading data from memory 112, the host computer system CPU (not shown in FIG. 1 for simplicity) or memory management unit of the host computer system may attempt to locate the memory address of the data in one or more data structures, such as a page table. The host computer system CPU and memory management unit are discussed in greater detail below in connection with FIG. 3. An exception or other fault may occur because memory address of the data requested by the virtual machine 120 is not in the one or more data structures. For example, a page fault may be generated as a result of the memory management unit not locating the memory address associated with the request data. A page fault maybe a trap or other error code transmitted to an application by the host computer system's hardware when the virtual machine 120 accesses a page that is mapped in a virtual address space, but not loaded in memory 112.

The hypervisor 118 or a component of the hypervisor 118 may be configured to receive exceptions, such as the page fault described above. The hypervisor 118 may then determine that the virtual machine 120 utilizes the memory obfuscation service 130 to obfuscate data store in the memory associated with the virtual machine 120. For example, the hypervisor 118 may set a flag associated with the virtual machine 120 indicating that the virtual machine 120 contains obfuscated memory. The hypervisor 118 may then provide the memory obfuscation service 130 with information corresponding to the requested data to enable the memory obfuscation service 130 to retrieve the requested data from memory 112 and provide the request data to the virtual machine 120. The memory obfuscation service 130 may provide the virtual machine 120 with the requested data by un-obfuscating the data from memory 112 and placing the un-obfuscated data or a copy of the data in an un-obfuscated format in a virtual cache 110. The memory obfuscation service 130 may then update the memory management unit with the address of the data in the virtual cache 110. The virtual machine 120 may then be allowed to retry the attempt to access the data, the virtual machine 120 may then be directed by the memory management unit to the address of the data in the virtual cache 110.

Figure 2:
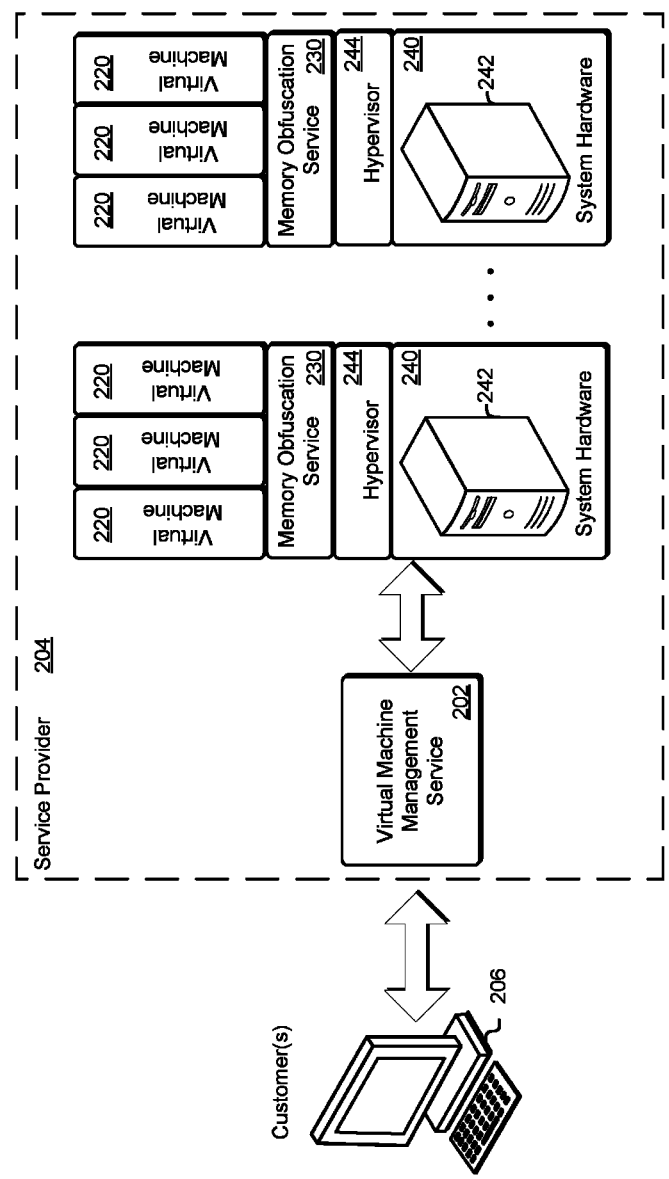
FIG. 2 is an illustrative environment where a virtual machine's memory may be obfuscated in accordance with various embodiments.

FIG. 2 illustrates a virtual computer system service in accordance with at least one embodiment. The virtual computer system service, which may be system hardware 240, is used by a service provider 204 to provide computation resources for customers. The system hardware 240 may include physical hosts 242 also referred to as a host computer system. The physical hosts 242 may be any device or equipment configured to execute instructions for performing data computation, manipulation or storage tasks, such as a computer or a server. A physical host 242 may be equipped with any needed processing capability including one or more processors, such as a central processing unit (CPU), memory management unit (MMU), a graphics processing unit (GPU) or a digital signal processor (DSP), memory, including static and dynamic memory, buses and input and output ports that are compliant with any handshaking, communications or data transfer protocol. The system hardware 240 may also include storage devices, such as storage disks and tapes, networking equipment and the like.

A virtualization layer executing on the physical host 242 enables the system hardware 240 to be used to provide computational resources upon which one or more virtual machines 220 may operate. For example, the virtualization layer may enable a virtual machine 220 to access system hardware 240 on the physical host 242 through virtual device drivers on the virtual machine 220. Furthermore, physical host 242 may host multiple hypervisors of the same or different types on the same system hardware 240. The hypervisor 244 may be any device, software or firmware used for providing a virtual computing platform for the virtual machines 220. In various embodiment, the memory obfuscation service 230 may provide un-obfuscated memory pages to the hypervisor 244 as opposed to or in connection with loading the un-obfuscated memory pages into the virtual cache. The hypervisor may then execute one or more operations included in the un-obfuscated memory page and cause a result of the execution to occur in the virtual machine 220. The virtual computing platform may include various virtual computer components, such as one or more virtual CPUs, virtual memory management units, virtual memory and the like. The virtual machines 220 may be provided to the customers of the service provider 204 and the customers may run an operating system or an application on the virtual machines 220. Further, the service provider 204 may use one or more of its own virtual machines 220 for executing its applications, such as the memory obfuscation service 230 or the virtual machine management service 202.

The virtual machine management service 202 may be a computer system configured to manage one or more virtual machines executing on physical host 242. For example, the virtual machine management service 202 may be a virtual machine or collection of virtual machines configured to provide customers with an interface to instantiate and control the operation of the one or more virtual machines 220. Customers of the computing resource service provider 204 may interact with the virtual machine management service 202, via appropriately configured and authenticated application programming interface (API) calls, to provision and operate virtual machine 220 instantiated on physical host 242 hosted operated by the service provider 204. As described above, the virtual machine 220 may be used for various purposes, such as to operate as servers supporting a website, to operate business applications, or, generally, to serve as computing power for the customer. Other applications for the virtual machine 220 may be to support database applications, electronic commerce applications, business applications, and/or other applications. The virtual machine management service 202 may allow the customer and the service provider 204 to manage virtual machines 220.

For example, the customer 206 may transmit a request to the virtual machine management service 202 to instantiate a virtual machine 220 on behalf of the customer 206. The request may be an API call including information corresponding to the customer 206 and virtual machine 220 to be instantiated. For example, the API request may include an indication to maintain the virtual machine's memory in an obfuscated format when not in use by the virtual machine 220. The memory obfuscation service 230 may be responsible for maintaining the virtual machine's 220 memory in an obfuscated format when at rest and un-obfuscating the virtual machine's 220 memory when required by the virtual machine 220. The customer 206 may communicate with the service provider 2-4 through a network, whereby the network may be a communication network, such the Internet, an intranet or an Internet service provider (ISP) network.

Figure 3:
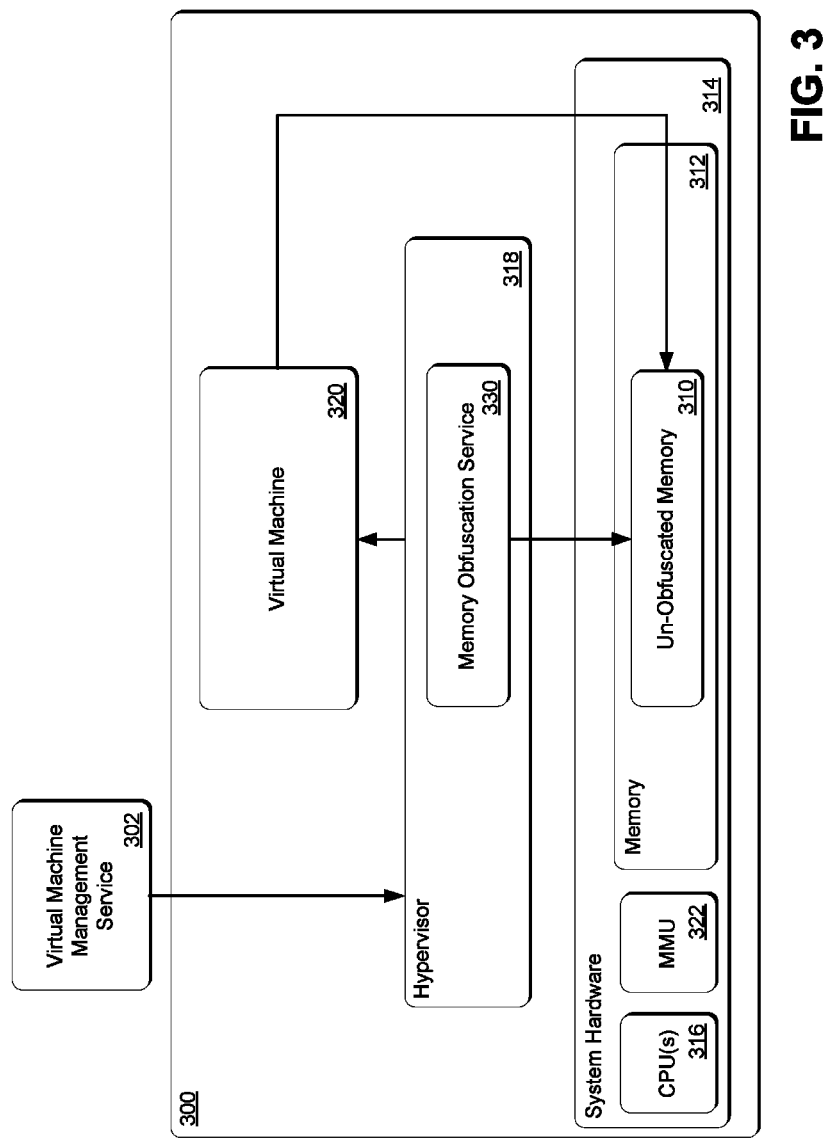
FIG. 3 is an illustrative example showing a host computer system supporting a virtual machine with obfuscated memory in accordance with various embodiments.

FIG. 3 is an illustrative example of a host computer system 300 illustrating various aspects of the present disclosure. As noted above, techniques described herein are applicable to supporting virtual machine memory obfuscation and un-obfuscation. Accordingly, FIG. 3 shows the host computer system 300 including system hardware 114. The system hardware 114 may include a memory 312, an un-obfuscated memory 310, a memory management unit (MMU) 322 and one or more central processing units (CPUs). System hardware 114 may be physical hardware of the host computer system 300 or all or a portion of the system hardware 314 may be virtualized. For example, the CPU 316 and the memory 310 may be physical hardware of the host computer system 300 and the MMU 322 and un-obfuscated memory 310 may be virtualized. Examples of the CPU 316 include CPUs utilizing a complex instruction set computing (CISC) architecture, such as the x86 CPU, and others that utilize a reduced instruction set computing (RISC) architecture, such as the advanced RISC machine (ARM) CPU. The host computer system 300 may enable the operation of a virtual machine 320 supported by a hypervisor 318. The hypervisor 318 may allow the virtual machine 320 to access the system hardware 314.

The MMU 322 may be a computing resource configured to maintain one or more data structures containing information useable for mapping virtual memory locations to physical memory locations. For example, the MMU 322 may be a processor with one or more page tables and a translation lookaside buffer (TLB). The TLB may be a cache of mappings from the virtual machine's 320 operating system page table, segment table or both. When the virtual machine 320 attempts to access a portion of memory 312, the CPU 316 may access one or more data structures (e.g. page tables) contained in the MMU 322 to determine a memory address associated with the portion of memory 312 the virtual machine 320 is attempting to access. If there is no record of the memory address contained in the MMU 322 a page fault may be generated. The page fault may cause operation of the CPU 316 to be paused until the page fault is resolved. For example, the CPU 316 may indicate a page fault an exception handler and pause execution until the exception handler has resolved the page fault, such as by writing the memory address into the page tables or terminating the process requesting access to the particular area of memory.

The hypervisor 318 or other component of the host computer system may be responsible for resolving page faults. For example, the hypervisor may support a root partition (also referred to as a parent partition), the root partition may be responsible for handling page faults and other exceptions issued by the CPU 316. When a page fault or other exception is issued by the CPU 316, control of the memory request operation may be passed to the memory obfuscation service 330. The memory obfuscation service may determine the address of memory 312 corresponding to the memory request and retrieve the requested memory or data contained in the request memory address. The memory obfuscation service 330 may then un-obfuscate the memory and store the un-obfuscated memory 310 in the memory 312 of the host computer system 312. The memory obfuscation service 330 may also update the MMU 322 with the memory address of the un-obfuscated memory 310. Updating the MMU 322 may cause the exception handler to return control or otherwise allow the CPU 316 to complete memory operations that may have been paused as a result of a page fault.

The virtual machine management service 302 may transmit one or more commands to the hypervisor 318, the one or more commands may enable the virtual machine management service 302 to manage the virtual machine 320 on behalf of a user. For example, the virtual machine management service 302 may transmit a command to the hypervisor 318, the command may cause the hypervisor 318 to instantiate the virtual machine 320 and load the obfuscated virtual machine's memory into the host computer system's 300 memory 312. A user may communicate with the virtual machine management service 302 via an interface, which may be a web services interface or any other type of user interface. The virtual machine management service 302 may enable the user to indicate a portion of the virtual machines memory to be obfuscated, a maximum or minimum amount of the virtual machine's 320 memory that is to remain un-obfuscated during operation of the virtual machine 320, a performance level of the virtual machine 320, a security level of the virtual machine 320 or other configuration information of the virtual machine 320.

Figure 4:
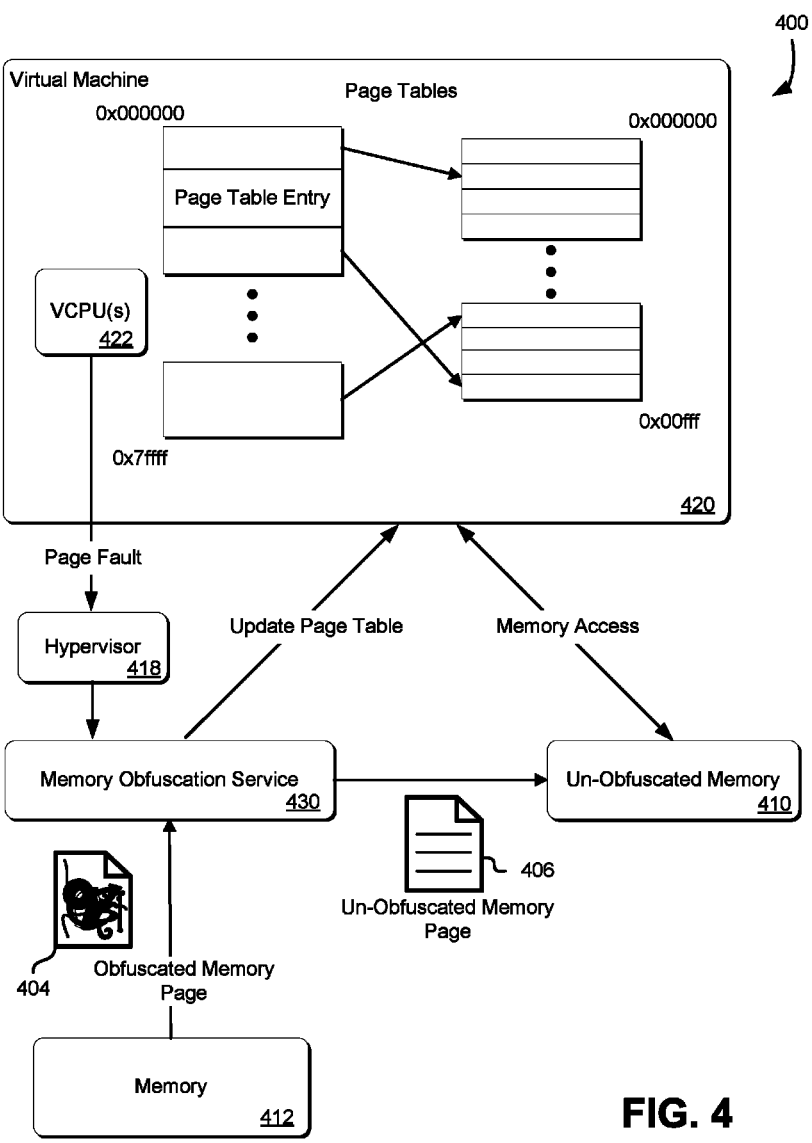
FIG. 4 is an illustrative environment where a virtual machine may access obfuscated memory in accordance with various embodiments.

FIG. 4 illustrates an example environment 400 where memory of a virtual machine 420 may be obfuscated in order to protect the virtual machine from various attacks. The virtual machine 420 may include one or more virtual central processing units 422 (VCPUs). The VCPUs 422 may be provided to the virtual machine 420 by a hypervisor 418. The VCPUs 422 may allow the virtual machine 420 to process various instructions and perform various operations. The VCPUs 422 provide the virtual machine 420 with access to one or more physical processors of a host computer system executing the virtual machine 420, such as described above in connection with FIG. 3. Although the VCPUs 422 are show in FIG. 4 as integral with the virtual machine 420, the VCPUs 422 may be part on another component illustrated in environment 400, such as the hypervisor 418, or may be an independent component.

In some embodiments, the virtual machine 420 may request data stored in the virtual machine's 420 memory. The request may be processed by the VCPU 422 or other processor, the processor responsible for processing the request may attempt to find the data in memory by examining one or more data structures for the memory address of the requested data. As illustrated in FIG. 4, a page table may contain information corresponding to the mapping of the virtual machine's 420 virtual address space to the physical memory address space of host computer system. Furthermore, the page tables may be configured with the physical memory address of the un-obfuscated memory 410. The un-obfuscated memory 410 may be configured as a virtual cache for the virtual machine 420. If the virtual machine 420 attempts to access data contained in the virtual cache, the page table may contain a particular page table entry mapping the virtual address of the data to the physical address of the data in the un-obfuscated memory 410.

If no record of the physical address of the data is contained in the page table, the VCPU 422 may generate a page fault. The page fault may be received by the hypervisor 418 or a component of the hypervisor 418 such as an exception handler. Furthermore, the page fault may cause the VCPU 422 to halt or pause operation of the data request until the hypervisor 418 or other service has corrected the page fault. The hypervisor 418 may then determine if the virtual machine 420 is configured such that the virtual machine's 420 memory is obfuscated, for example if the user requested the virtual machine's 420 memory to be obfuscated. The hypervisor 418 may make the determination based on information associated with the virtual machine 420 such as a flag. If the virtual machine 420 is configured such that the virtual machine's 420 memory is obfuscated the hypervisor 418 or component thereof may call the memory obfuscation service 430. The hypervisor 418 may make a service call to the memory obfuscation service 430, the service call may include information suitable for retrieving the data from memory and loading the data into the virtual cache (e.g., un-obfuscated memory 410) associated with the virtual machine 420.

Once the memory obfuscation service 430 receives the service call it may obtain the obfuscated data from the memory 412. In various embodiments, the memory obfuscation service 430 generates a copy of the obfuscated data for use in the virtual cache associated with the virtual machine 420. The obfuscated data may be an obfuscated memory page 404 or may be contained in an obfuscated memory page 404. The memory obfuscation service 430 may cause the obfuscated memory page 404 to be un-obfuscated thereby generating an un-obfuscated memory page 406. Any reversible transformation may be used to obfuscate and un-obfuscate the data contained in memory such as symmetric encryption. The un-obfuscated memory page 406 may be loaded into physical memory of the host computer system and the memory obfuscation service 430 may update the page table with the physical memory location of the un-obfuscated memory page 406. Although the page table is illustrated in FIG. 4 inside the virtual machine 420, the page table may be located in one or more other components of the host computer systems such as the memory management unit associated with one or more processors of the host computer system. Once the page table has been updated the VCPU 422 may be allowed to continue processing the data request and retrieve the data from memory for the virtual machine 420.

Figure 5:
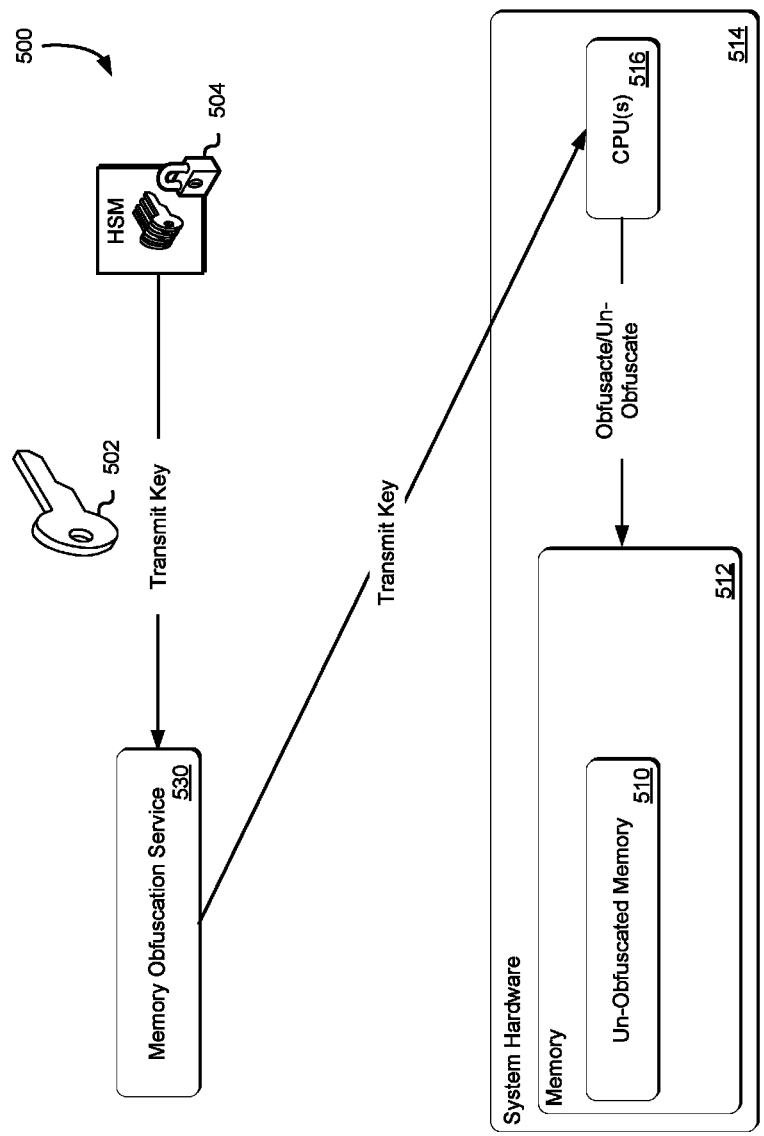
FIG. 5 is an illustrative environment where a memory obfuscation service may provide a key for protecting memory in accordance with various embodiments.

FIG. 5 illustrates an example environment 500 where a key 502 may be used to obfuscate the memory of a virtual machine 420 in order to protect the virtual machine from various attacks. The key 502 may be provided by a hardware security module 504 (HSM) to the memory obfuscation service 530. The key 502 may be associated with a particular user such that all the virtual machines associated with the user are obfuscated with the same key or each virtual machine configured to contain obfuscated memory may receive a particular key to be used only to obfuscate the memory of the virtual machine associated with the particular key. The memory obfuscation service 530 may receive all or a portion of the key 502 from one or more other sources including a trusted platform module (TPM), the user, another service, a cryptographic processor or any other suitable source for distributing keying material. In various embodiments, the memory obfuscation service does not directly receive the key 502 but causes the key 502 to be securely transmitted to the one or more CPUs 516 of the host computer system. For example, the memory obfuscation service 530 may cause the CPUs 516 to request a key from the HSM 502 to be used to obfuscate and un-obfuscate the memory of a particular virtual machine. The HSM 504 may then be responsible for associating the key 502 with the particular virtual machine and maintaining the key on behalf of the particular virtual machine.

One or more symmetric-key algorithms may be used to generate the key 502. The symmetric-key algorithms may be a set of algorithms suitable for obfuscating data such that the same key 502 may be used for both encryption of plaintext and decryption of ciphertext. The key 502 may be identical or there may be a simple transformation to go between the two or more keys. The keys may represent a shared secret between two or more parties, such as the virtual machine and the memory obfuscation service, that may be used to maintain private or sensitive information. Other obfuscation techniques may be used that do not require a key such as data masking, substitution, shuffling or any other reversible transformation suitable for providing at least some protection of sensitive data.

In some embodiments, the memory obfuscation service may contain the HSM 504 or other cryptographic hardware configured to securely generate and manage the key 502. The memory obfuscation service 530 may provide the key 502 to the CPU 516 of the host computer system. The CPU 516 may be part of the system hardware 514 of the host computer system. The system hardware 514 may also include memory 512. The system hardware 514 may include a combination of physical hardware and virtual hardware configured to support operations of the host computer system. For example, the system hardware 514 may include memory 512 which may be physical memory and in-obfuscated memory 510 which may be a virtual cache of a guest operating system executed by the host computer system. Once the key 502 has been provided to the CPU 516, the CPU 516 may use the key 502 to obfuscate and/or un-obfuscate memory 512. All or a portion of the memory 512 may be obfuscated using the key 502. Furthermore, at least a portion of the memory 512 may be obfuscated with a different key from key 512. For example, memory 512 may contain virtual machine memory from two or more virtual machines and each virtual machine may have a different associated key.

Figure 6:
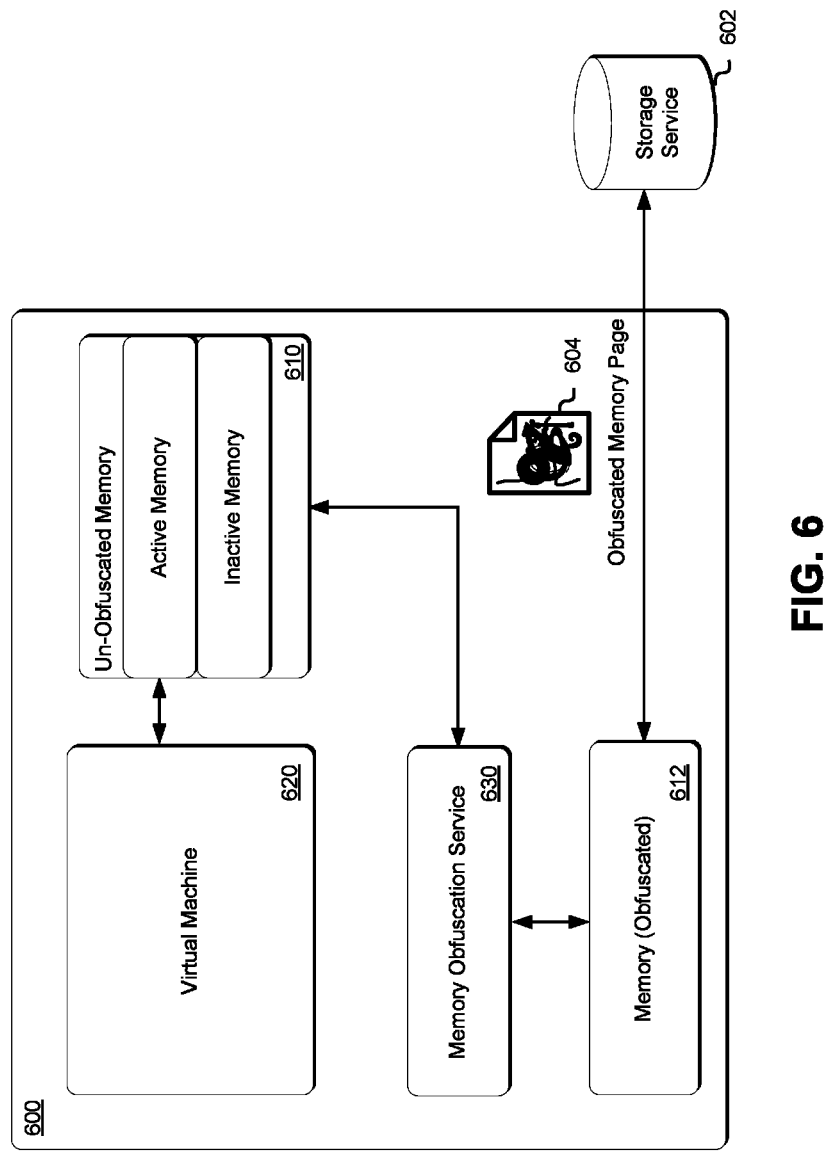
FIG. 6 is an illustrative example showing a host computer system supporting a virtual machine with obfuscated memory in accordance with various embodiments.

FIG. 6 is an illustrative example of a host computer system 600 with a virtual cache and obfuscated memory in order to protect sensitive information. When a virtual machine 620 is instantiated on to host computer system 600 the virtual machine's 620 obfuscated memory may be retrieved from a storage service 602 and loaded into memory 612 of the host computer system 600. When the virtual machine 620 is persisted in a storage device the memory obfuscation service 630 may obfuscate any un-obfuscated portion of the virtual machine's 620 memory. For example, during operation of the virtual machine 620 at least some of the virtual machine's 620 memory may be in un-obfuscated memory 610 in order for the virtual machine 620 to be able to use the information contained in the un-obfuscated memory 610. When the virtual machine is terminated or caused to be persisted in storage, the memory obfuscation service 630 may obfuscate the un-obfuscated memory 610 before the virtual machine 620 is persisted in storage. The storage service 602 may be a service of a service provider used to operate an on-demand data storage service. The storage service 602 may include various subsystems such as a request processing subsystem, a management subsystem, a plurality of data storage servers and metadata storage, which may store metadata about various data objects stored among the data storage servers.

Virtual machine 620 memory loaded into the memory 612 of the host computer system 600 may be obfuscated to protect sensitive information from attack. The memory obfuscation service may un-obfuscate at least a portion of the memory for use by the virtual machine 620 as described above in connection with FIG. 4. The memory obfuscation service 630 may track the use of un-obfuscated memory 610 to determine memory that is no longer in use by the virtual machine 620 and obfuscate the memory. The memory obfuscation service 630 may check the un-obfuscated memory 610 to determine active use. For example, the memory obfuscation service 630 may maintain a counter configured to count the number of time the virtual machine 620 access a particular memory address. Other techniques may be used to determine if the particular memory address is active. The memory obfuscation service 630 may operate one or more timers, the timers may indicate the amount of time that had elapsed since the last attempt by the virtual machine to access a particular memory address. For example, the memory obfuscation service may start a timer once the memory obfuscation service 630 has loaded an un-obfuscated memory page into the virtual cache, such as the un-obfuscated memory 610. At the expiration of the timer the memory obfuscation service 630 may detach (also referred to as unmapping) the memory page from the page table. The memory obfuscation service 630 may detach memory pages from the page table by removing the record from the page table.

The memory obfuscation service 630 may maintain a list of detached memory pages or the memory obfuscation service may cause the memory pages to be obfuscated once they are detached from the page table. Obfuscated memory pages may be stored in the storage service 602. In various embodiments, the memory obfuscation service 630 copies the memory pages from memory and causes the un-obfuscated memory pages to be stored in un-obfuscated memory 610. If the un-obfuscated memory 610 contains copies of the memory pages from memory 612, the memory obfuscation service 630 may cause the memory pages to be deleted once the memory pages are detached from the page table. The memory obfuscation service 630 may also obfuscate data generated by the virtual machine 620 and cause the obfuscated data to be stored once the virtual machine 620 is no longer using the generated data.

The memory obfuscation service 630 may also queues inactive memory pages for obfuscation. The memory pages may first detached from the MMU data structures (e.g., page tables) associated with the virtual machine operating on the host computer system 600 before the data contained in the memory pages is obfuscated. For example, memory obfuscation service 630 may detach a particular memory page based at least in part on the virtual machine 620 not accessing the particular memory page for a period. The memory obfuscation service 630 may then start a timer, at the expiration of the timer the memory obfuscation service may obfuscate the data contained in the memory page and cause the obfuscated data to be stored in the memory 612. If the virtual machine attempts to access the memory page before the expiration of the timer, the memory obfuscation service 630 may update the page table with the physical address of the memory page in the un-obfuscated memory. The obfuscated memory page 604 may be written to storage once it has been evicted from the virtual cache or at some point in time after it has been evicted from the virtual cache.

The memory obfuscation service 630 or some other service of the service provider may determine memory pages that are likely to be used or that are likely no longer to be used by the virtual machine and queue the memory pages for obfuscation or un-obfuscation. For example, machine learning algorithms may be used to predict memory page usage by the virtual machine, the predicted memory page information may then be used by the memory obfuscation service 630 to pre-load portions of the virtual machine's 620 memory in to un-obfuscated memory 610. Furthermore, the predicted memory page information may be used to remove inactive memory pages from un-obfuscated memory 610 and obfuscate the memory pages. In some embodiments, the predicted memory page information may be used to increase or decrease the size of the un-obfuscated memory. The memory obfuscation service 630 may then increase the size of the virtual cache associated with the virtual machine 620 by loading additional un-obfuscated memory pages into the un-obfuscated memory 610. The memory obfuscation service 630 may determine additional un-obfuscated memory pages into the un-obfuscated memory 610 based at least in part on the predicted memory page information.

Memory pages may also be classified or otherwise differentiated such that certain memory pages are maintained in an un-obfuscated state in the virtual cache for a period. For example, memory pages associated with an operating system of the virtual machine 620 may be maintained by the memory obfuscation service 630 in un-obfuscated memory 610 during execution of the virtual machine 620. Furthermore, certain memory pages may be classified such that the memory obfuscation service 630 prioritizes maintaining the memory page in the virtual cache over one or more other memory pages. For example, the memory obfuscation service 630 or other service of the service provider may determine that particular memory pages of the virtual machine are accessed more frequently and classify those memory pages as "frequent access" memory pages. The memory obfuscation service 630 may then maintain the "frequent access" memory pages in un-obfuscated memory 610 despite the memory pages having not been accessed for a period. The memory obfuscation service 630 may maintain a set of memory pages that have a lower priority for eviction from the virtual cache than one or more other memory pages. Returning to the example above, the memory obfuscation service may maintain a set of kernel memory pages associated with the operating system of the virtual machine 620 which have a lower priority of eviction from the un-obfuscated memory 610 than other memory pages of the virtual machine 620.

Figure 7:
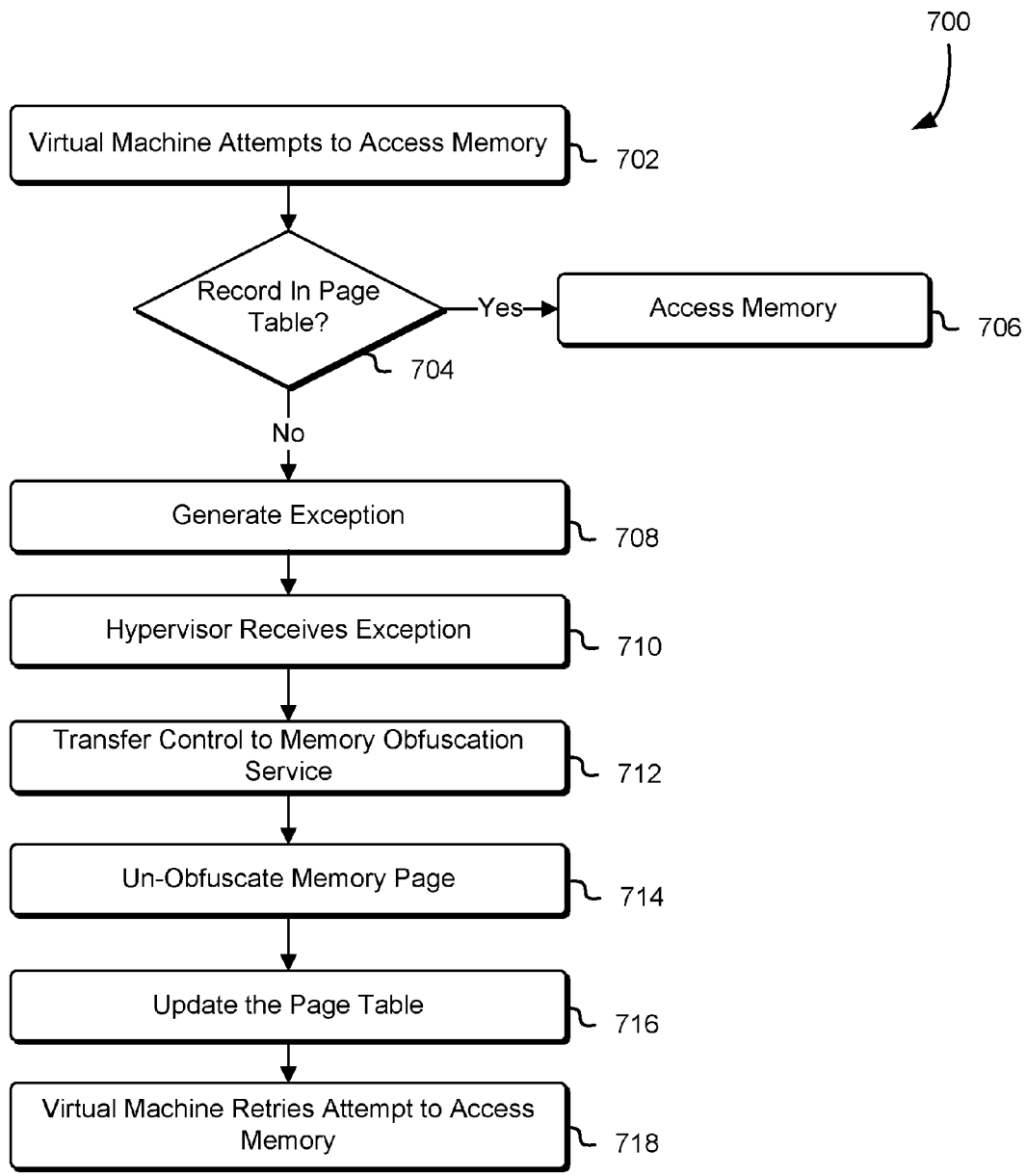
FIG. 7 is an illustrative example of a process for providing a virtual machine with un-obfuscated memory in accordance with various embodiments.

FIG. 7 shows an illustrative example of process 700 which may be used provide one or more obfuscated memory pages to a virtual machine. The process 700 may be performed by any suitable system such as the memory obfuscation service 230 described above in connection to FIG. 2. Returning to FIG. 7, in an embodiment, the process 700 includes a virtual machine attempting to access obfuscated memory 702. Memory access may include attempting to interact with data store in memory or write data to memory.

For example, the virtual machine may attempt to retrieve data from memory. The memory of the virtual machine may be obfuscated as a result of a user of the virtual machine requesting memory obfuscation. In various embodiments, the service provider providing the virtual machine obfuscates the memory of the virtual machine without a request from a user of the virtual machine.

The virtual machine may be supported by a host computer system as described above in connection with FIG. 3, the host computer system may provide a CPU and MMU support operation of the virtual machine. The CPU of the host computer system or a virtual CPU of the virtual machine may attempt to locate the memory address of the data the virtual machine is attempting to access. The memory address may be located in a record contained in one or more data structures of the MMU. If the record exists in the page table 704 of the MMU, the virtual machine may be provided with access to the data contained at the memory 706 address indicated by the record. If no record is contained in the page table 704, an exception may be generated 708. For example, the CPU of the host computer system may search the page tables of the MMU for a record of the physical address of the requested data, if the CPU determines that there is no record in the page tables of the MMU the CPU may generate a page fault.

The generated exception may be received by a hypervisor 710, the hypervisor may be executed by the host computer system in order to provide virtualization support to the virtual machine. The hypervisor may include an exception handler or other component configured to resolve exceptions generated by the host computer system, virtual machine or components thereof. In various embodiments, the requested memory page is un-obfuscated and loaded in memory of the host computer system at the time the exception is generated, but is not marked in the MMU as being loaded in memory. The exception handler in the hypervisor then makes the entry for that memory page in the MMU point to the address in memory and indicate that the memory page is loaded in memory. For example, memory obfuscation service may predict a memory page the virtual machine may use in the future and pre-load the un-obfuscated memory page into the memory of the host computer.

In some embodiments, the exception handler may transfer control to the memory obfuscation service 712. Transferring control may include causing other components processing the attempted memory access to pause operation until the memory obfuscation service returns control to the other components. For example, the CPU of the host computer system may wait until the memory obfuscation service and/or exception handler return information corresponding to the attempted memory access before continuing to process the attempted memory access. The memory obfuscation service may then determine the location of the memory page in the memory of the host computer system and un-obfuscate the memory page 714. Un-obfuscating the memory page 714 may include decrypting the memory page resident in memory or copying the obfuscated memory page to another area of memory and un-obfuscating the copy of the memory page. As described above the obfuscated memory page may be obfuscated using any reversible transformation suitable for providing at least some protection to sensitive information.

Once the memory management service has un-obfuscated the memory page, the memory obfuscation service may update the page tables 716 of the MMU with the memory address of the un-obfuscated memory page. Updating the page table may include adding a record of the memory address corresponding to the un-obfuscated memory page or modifying an existing record to point to the memory address corresponding to the un-obfuscated memory page. Once the page table has been updated, the memory obfuscation service and/or exception handler may notify the CPU of the host computer system and the CPU may retry the attempt to access the memory 718. The CPU may retry the attempt to access the memory 718 by restoring the previous operation state before the exception was generated and searching the page table for the address of the memory the virtual machine is attempting to access.

Figure 8:
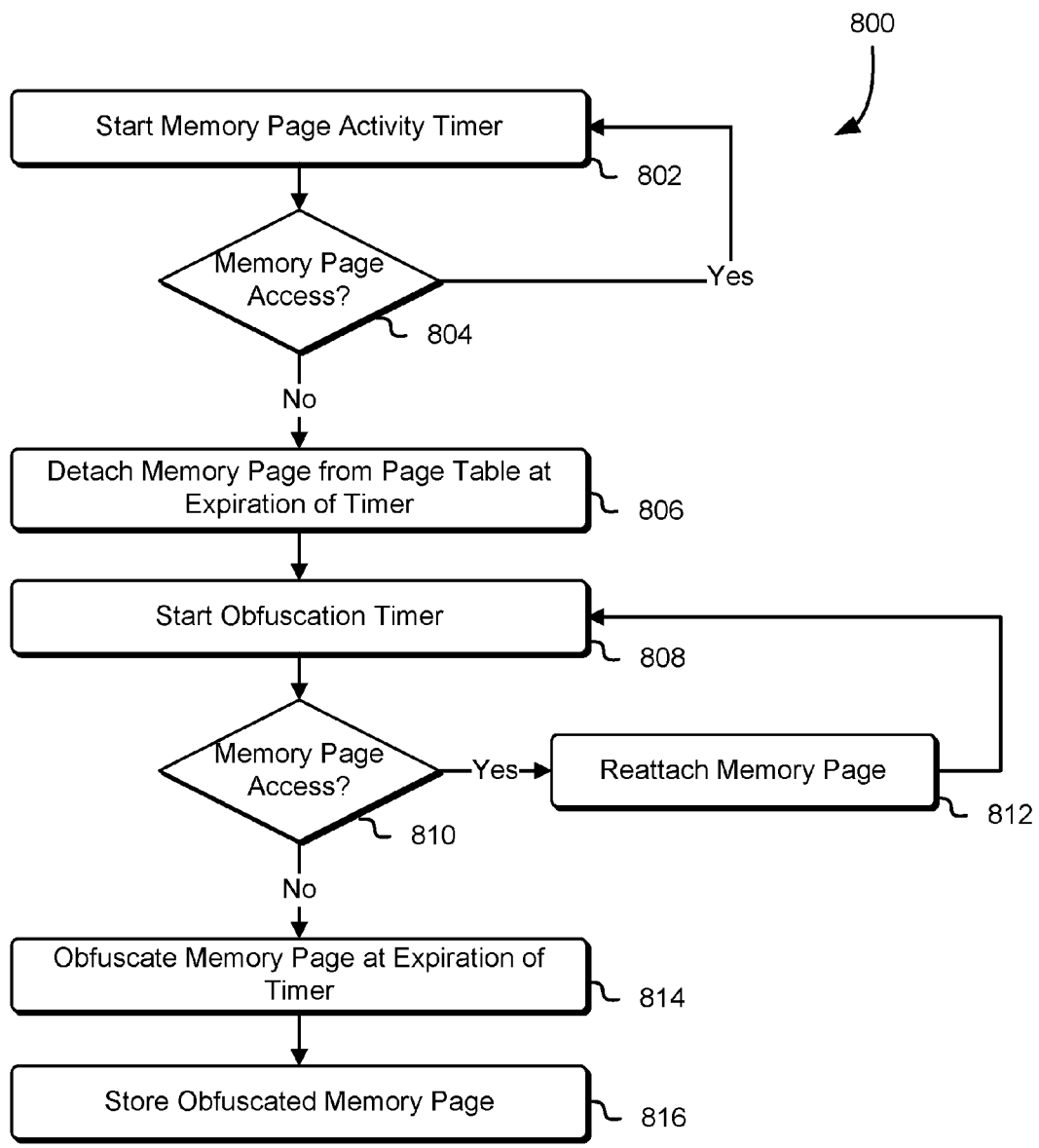
FIG. 8 is an illustrative example of a process for obfuscating a virtual machine's memory in accordance with various embodiments.

FIG. 8 shows an illustrative example of process 800 which may be used to protect virtual machine memory. The process 800 may be performed by any suitable system such as the memory obfuscation service 630 described above in connection to FIG. 6. Returning to FIG. 8, in an embodiment, the process 800 includes starting a memory page activity timer 802. The memory page activity timer may be used by the memory obfuscation service to monitor and/or track activity of a particular un-obfuscated memory page in a virtual cache associated with a virtual machine. During execution of the timer if the memory page is accessed 804 the timer may be restarted. However if the memory page is not accessed 804 the memory obfuscation service may cause the memory page to be detached from the page table at the expiration of the memory page activity timer 806. Detaching the memory page from the page table may include removing the record associated with the memory page from the page table of the MMU of the host computer system as described above in connection with FIG. 6.

Once the memory page has been detached 806, the memory obfuscation service may then start obfuscation timer 808. If during the execution of the obfuscation timer the virtual machine attempts to access the memory page 810, the memory obfuscation service may reattach the memory page 812 and restart the obfuscation timer. The memory obfuscation service may reattach the memory page by modifying the page tables of the MMU as described above in connection with FIG. 6. If the memory page is not accessed 810 before the expiration of the timer, the memory obfuscation service may obfuscate the memory page 814. The memory obfuscation service may obfuscate the memory using a key as described above in connection with FIG. 5. For example, the memory obfuscation service may use a symmetric key encryption algorithm such as a stream cipher or block cipher to obfuscate the memory page. Once the memory page has been encrypted it may be stored in the memory of the host computer system or an auxiliary storage device such as a hard disk drive or storage service. In numerous variations of process 800, the memory page may be a copy of obfuscated memory pages stored in the memory of the host computer system. The memory page may then be deleted without the need to obfuscate the memory page at the expiration of the timer 814 or storing the obfuscated memory page 816.

Figure 9:
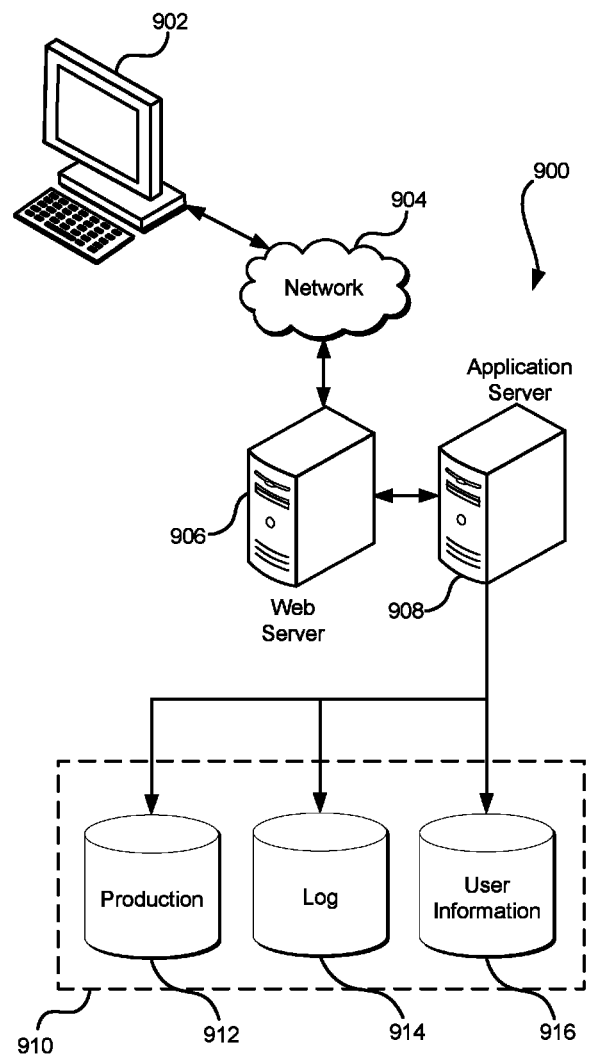
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed:

1. A computer-implemented method, comprising:
   under the control of a host computer system that executes executable instructions,
   instantiating a virtual machine by at least loading obfuscated memory associated with the virtual machine into memory of the host computer system;
   receiving a request to access at least one memory page stored in obfuscated memory and at least partially referenced in a page table, where a memory management unit of the host computer system determines that the at least one memory page stored in obfuscated memory is at least partially referenced in the page table and the page table is provided by the memory management unit;
   transmitting a command to a memory obfuscation service, the command causing the memory obfuscation service to un-obfuscate the at least one memory page and load the at least one memory page into a virtual cache associated with the virtual machine; and
   providing the virtual machine with access to the at least one memory page.

2. The computer-implemented method of claim 1, wherein causing the memory obfuscation service to un-obfuscate the at least one memory page includes generating a copy of the at least one memory page and un-obfuscating the copy of the at least one memory page to generate the at least one memory page.

3. The computer-implemented method of claim 1, wherein obfuscated memory includes memory encrypted using a symmetric encryption key accessible to the memory obfuscation service and the virtual machine.

4. The computer-implemented method of claim 1, wherein the computer-implemented method further includes obfuscating the memory in response to a command to persist the virtual machine.

5. A system, comprising:
   one or more processors; and
   a first memory with instructions that, as a result of execution by the one or more processors, cause the system to:
   load encrypted data into a second memory associated with a virtual machine;
   detect conditions indicative of an upcoming attempt, by the virtual machine, to access at least a portion of the encrypted data;
   decrypt the portion of the encrypted data associated with the upcoming attempt;
   receive a request to access at least the portion of the encrypted data stored in the second memory and at least partially referenced in a page table; and
   in response to an exception generated as a result of the request, load the data into the second memory.

6. The system of claim 5, wherein the first memory further includes instructions that, as a result of execution by the one or more processors, cause the system to encrypt the data in response to a command to persist the virtual machine.

7. The system of claim 5, wherein loading the data into the second memory further comprises executing, by a hypervisor, an instruction indicated in the data, such that execution of the instruction by the hypervisor causes a result of the instruction's execution to occur in the virtual machine.

8. The system of claim 7, wherein the first memory further includes instructions that, as a result of execution by the one or more processors, cause the system to dynamically increase a size of the second memory by at least increasing a size allocated to the second memory and loading additional data into the second memory.

9. The system of claim 5, wherein the first memory further includes instructions that, as a result of execution by the one or more processors, cause the system to encrypt the data in response to a second request to instantiate the virtual machine.

10. The system of claim 5, wherein the first memory further includes instructions that, as a result of execution by the one or more processors, cause the system to update a memory management unit by at least modifying a page table of the memory management unit to include a memory address of the data loaded into the second memory.

11. The system of claim 5, wherein the first memory further includes instructions that, as a result of execution by the one or more processors, cause the system to provide the virtual machine with access to the second memory as a virtual cache of the virtual machine.

12. The system of claim 5, wherein the first memory further includes instructions that, as a result of execution by the one or more processors, cause the system to encrypt the data using a symmetric encryption key.

13. A non-transitory computer-readable storage medium having collectively stored thereon executable instructions that, as a result of execution by one or more processors of a computer system, cause the computer system to at least:
provide data to a hypervisor for execution, wherein the hypervisor manages an application and the application generates an error code;
detect the error code transmitted by the application, as a result of the application attempting to access data that is incompletely referenced in memory;
as a result of detecting the error code, obtain the data in an obfuscated format;
un-obfuscate the data obtained in the obfuscated format; and
modify a reference in memory so that the data is completely referenced and accessible to the application.

14. The non-transitory computer-readable storage medium of claim 13, wherein the instructions further comprise instructions that, as a result of execution by the one or more processors, cause the computer system to retrieve additional data prior to an attempt by the application to access the additional data.

15. The non-transitory computer-readable storage medium of claim 13, wherein the instructions further comprise instructions that, as a result of execution by the one or more processors, cause the computer system to queue the reference to the data to be removed from a page table in memory as a result of the application not attempting to access the data during an interval of time.

16. The non-transitory computer-readable storage medium of claim 15, wherein the instructions that cause the computer system to queue the reference further include instructions that cause the computer system to:
remove the reference from the page table; and
delete the data from memory.

17. The non-transitory computer-readable storage medium of claim 15, wherein the instructions that cause the computer system queue the reference further include instructions that cause the computer system to:
remove the reference from the page table; and
encrypt the data.

18. The non-transitory computer-readable storage medium of claim 13, wherein the instructions that cause the computer system to un-obfuscate the data further include instructions that cause the computer system to obtain a cryptographic key used to un-obfuscate the data from a memory obfuscation service.

19. The non-transitory computer-readable storage medium of claim 13, wherein the instructions further comprise instructions that, as a result of execution by the one or more processors, cause the computer system to provide the data to the application.

20. The non-transitory computer-readable storage medium of claim 13, wherein the instructions that cause the computer system to un-obfuscate the data further include instructions that cause the computer system to un-obfuscate the data by at least generating a copy of the data and un-obfuscating the copy of the data.

* * * * *